(12) United States Patent
Hudson et al.

(10) Patent No.: US 11,085,271 B2
(45) Date of Patent: Aug. 10, 2021

(54) DOWNHOLE POWER DELIVERY

(71) Applicant: METROL TECHNOLOGY LTD, Aberdeen (GB)

(72) Inventors: Steven Martin Hudson, Aberdeen (GB); Leslie David Jarvis, Aberdeen (GB)

(73) Assignee: Metrol Technology Ltd., Aberdeenshire (GB)

( * ) Notice: Subject to any disclaimer, the term of this patent is extended or adjusted under 35 U.S.C. 154(b) by 0 days.

(21) Appl. No.: 16/498,423

(22) PCT Filed: Mar. 28, 2018

(86) PCT No.: PCT/GB2018/050842
§ 371 (c)(1),
(2) Date: Sep. 27, 2019

(87) PCT Pub. No.: WO2018/178689
PCT Pub. Date: Oct. 4, 2018

(65) Prior Publication Data
US 2020/0032621 A1    Jan. 30, 2020

(30) Foreign Application Priority Data

Mar. 31, 2017 (WO) ................ PCT/GB2017/050912

(51) Int. Cl.
*E21B 41/00* (2006.01)
*E21B 17/02* (2006.01)
(Continued)

(52) U.S. Cl.
CPC ........ *E21B 41/0085* (2013.01); *E21B 17/003* (2013.01); *E21B 17/028* (2013.01);
(Continued)

(58) Field of Classification Search
CPC .... E21B 41/0085; E21B 47/13; E21B 17/003; E21B 17/028; E21B 17/1078;
(Continued)

(56) References Cited

U.S. PATENT DOCUMENTS

| 4,901,069 A | 2/1990 | Veneruso |
| 5,941,307 A | 8/1999 | Tubel |

(Continued)

FOREIGN PATENT DOCUMENTS

| EP | 0 964 134 | 12/1999 |
| EP | 1 259 710 | 11/2002 |

(Continued)

OTHER PUBLICATIONS

International Search Report for PCT/GB2018/050842, dated Jun. 7, 2018, 4 pages.

(Continued)

*Primary Examiner* — Nicole Coy
(74) *Attorney, Agent, or Firm* — Nixon & Vanderhye, P.C.

(57) ABSTRACT

A well installation comprising downhole power delivery apparatus for delivering electrical power from a surface power source S to a downhole tool T. The well installation comprises downhole metallic structure (2) running down into a borehole. The apparatus comprises an electrical cable (3) for carrying electrical power from the surface power source S, a power transfer arrangement (4) and a power pick up arrangement (5). The cable 3 runs down into the borehole together with the metallic structure (2) to the power transfer arrangement (4) which is provided at a first downhole location for transferring electrical power carried by the electrical cable (3) onto the downhole metallic structure (2) for onward conduction. The power pick up arrangement (5) is provided at a second downhole location, spaced from the (Continued)

first, for picking up electrical power from the downhole metallic structure (2) for supply to the downhole tool T.

35 Claims, 7 Drawing Sheets

(51) Int. Cl.
  *E21B 36/04* (2006.01)
  *E21B 47/13* (2012.01)
  *E21B 17/00* (2006.01)
  *E21B 17/10* (2006.01)
  *E21B 47/00* (2012.01)
  *E21B 33/13* (2006.01)
  *H04B 7/155* (2006.01)
  *E21B 33/134* (2006.01)

(52) U.S. Cl.
  CPC .......... *E21B 17/1078* (2013.01); *E21B 33/13* (2013.01); *E21B 36/04* (2013.01); *E21B 47/00* (2013.01); *E21B 47/13* (2020.05); *H04B 7/155* (2013.01); *E21B 33/134* (2013.01)

(58) Field of Classification Search
  CPC .......... E21B 33/13; E21B 36/04; E21B 47/00; E21B 47/12; H04B 7/155
  See application file for complete search history.

(56) References Cited

U.S. PATENT DOCUMENTS

| | | | |
|---|---|---|---|
| 6,464,011 B2 | 10/2002 | Tubel | |
| 6,504,258 B2 | 1/2003 | Schultz et al. | |
| 6,515,592 B1* | 2/2003 | Babour | E21B 47/13 340/854.4 |
| 7,055,592 B2 | 6/2006 | Bass et al. | |
| 7,140,434 B2* | 11/2006 | Chouzenoux | E21B 49/008 166/250.11 |
| 7,242,103 B2 | 7/2007 | Tips | |
| 8,033,328 B2 | 10/2011 | Hall et al. | |
| 8,624,530 B2 | 1/2014 | Chung et al. | |
| 9,951,608 B2* | 4/2018 | Hudson | E21B 47/13 |
| 2002/0043369 A1 | 4/2002 | Vinegar et al. | |
| 2002/0121366 A1* | 9/2002 | Bass | E21B 34/08 166/53 |
| 2003/0042016 A1 | 3/2003 | Vinegar et al. | |
| 2003/0042026 A1 | 3/2003 | Vinegar et al. | |
| 2003/0051881 A1 | 3/2003 | Vinegar et al. | |
| 2003/0058127 A1* | 3/2003 | Babour | E21B 47/13 340/854.3 |
| 2003/0066671 A1 | 4/2003 | Vinegar et al. | |
| 2004/0079524 A1 | 4/2004 | Bass et al. | |
| 2013/0321165 A1* | 12/2013 | Johannessen | G01V 13/00 340/854.4 |
| 2019/0353011 A1* | 11/2019 | Ross | H02M 3/33523 |

FOREIGN PATENT DOCUMENTS

| | | |
|---|---|---|
| EP | 1 777 801 A2 | 4/2007 |
| EP | 1 899 574 | 3/2008 |
| EP | 1 918 508 A1 | 5/2008 |
| WO | WO 99/37009 A1 | 7/1999 |
| WO | WO 2006/100450 A1 | 9/2006 |
| WO | WO 2008/148613 A2 | 12/2008 |

OTHER PUBLICATIONS

Written Opinion of the ISA for PCT/GB2018/050842, dated Jun. 7, 2018, 9 pages.

* cited by examiner

DOWNHOLE POWER DELIVERY

This application is the U.S. national phase of International Application No. PCT/GB2018/050842 filed 28 Mar. 2018, which designated the U.S. and claims priority to IB Patent Application No. PCT/GB2017/050912 filed 31 Mar. 2017, the entire contents of each of which are hereby incorporated by reference.

This invention relates to downhole power delivery apparatus, methods for downhole power delivery and well installations including downhole power delivery apparatus.

There is a general issue as to how to provide power in downhole locations in well installations. This power may be needed for taking measurements of, for example, pressure and/or temperature and transmitting these back to the surface and/or for controlling components downhole such as valves.

Various different techniques have been used in an attempt to address this issue.

However, in practice in many situations there is little realistic alternative other than to use batteries. As is well understood, particularly in downhole situations where temperatures can be high, battery life can be a significant problem and the overall life of a tool provided downhole may be dictated by its battery life. An operation to recover a tool to replace the batteries will at best be extremely expensive and in some cases impossible.

Another potential solution for providing power downhole is to deliver power directly by a cable running downhole to the location where power is required. However, there are significant limits to where such a technique can be used. As a first example, it is undesirable to have such a cable penetrating through a packer or a plug, be that a cement (or other sealing material) plug, or another more mechanical type of plug, as this increases the chance of leaks or failure. As a second example, at least in practical terms, it is only possible to run a cable downhole from the surface into one bore in a multi-lateral well.

Thus, it would be desirable to provide an alternative method for providing power downhole.

According to a first aspect of the present invention there is provided a well installation comprising downhole power delivery apparatus for delivering electrical power from a surface power source to a downhole tool, the well installation comprising downhole metallic structure running down into a borehole and the apparatus comprising an electrical cable for carrying electrical power from the surface power source, a power transfer arrangement and a power pick up arrangement, the cable running down into the borehole together with the metallic structure to the power transfer arrangement which is provided at a first downhole location for transferring electrical power carried by the electrical cable onto the downhole metallic structure for onward conduction, and the power pick up arrangement being provided at a second downhole location, spaced from the first, for picking up electrical power from the downhole metallic structure for supply to the downhole tool.

This arrangement can allow power to be delivered to tools in difficult to reach downhole locations whilst maximising the efficiency of power transfer. The losses in the cable will be much lower than in the downhole metallic structure, thus the cable may be used for transmission of power for as far as is convenient/possible into the borehole and the power transferred on to the metallic structure at that stage.

As will be understood, the downhole metallic structure will typically comprise one or more run of metallic pipe sections—these will be present as one of, or a combination of, casing, liner or production string at respective depths within the well depending on the structure of the well.

Typically it is only possible or practical to put a cable from the surface via a main bore into one bore of a multi-lateral well. Thus the present techniques may be useful in supplying power to one or more bores in a multi-lateral well.

Typically the second downhole location will be further downhole than the first downhole location. Thus in this case onward conduction will be onward conduction further downhole. Typically the well installation will comprise a well head.

The well installation may be a multi-lateral well installation comprising a main bore and at least one lateral bore branching from the main bore. The power transfer arrangement may be provided for transferring electrical power onto the downhole metallic structure in a main bore of the multi-lateral well installation and the power pick up arrangement may be provided for picking up electrical power from the downhole metallic structure in a lateral bore.

The power transfer arrangement may be provided for transferring electrical power onto the downhole metallic structure in a main bore of the multi-lateral well at a location above where the at least one lateral bore branches from the main bore.

The power transfer arrangement may be provided for transferring electrical power onto the downhole metallic structure at a location above a packer provided in the well installation. This can avoid the need for the cable to penetrate or otherwise pass the packer.

This can be useful in multi-lateral wells but also is useful in general.

In another example the power transfer arrangement may be provided for transferring electrical power onto downhole metallic structure in an abandoned well at a location above a plug, such as a cement (or other sealing material) plug or a more mechanical type of plug, which seals the well.

Typically a sealing material as mentioned above and further below will be a cement based material. In principle different sealing materials besides cement may be used to form a plug—these might be other materials which solidify or set, or even say, a gel-like material. A plug may also comprise a secondary plug element as well as a sealing material. The secondary plug element may be metallic and may be used in installation of the plug and/or for acting as part of the seal and/or for performing other functions.

The downhole metallic structure of the well installation may comprise an extension section extending beyond a production zone.

In particular, the well installation may be arranged so that beyond the location of the power pick up arrangement, the downhole metallic structure extends beyond a production zone of the well. This extension may be further into the reservoir or out of the reservoir and into a conductive zone. This for example may be below the reservoir.

This can help in drawing current along the metallic structure to help in the efficiency of power delivery as far as the power pick up arrangement. As more current is drawn along the metallic structure less is lost via losses to the surroundings along the length of the metallic structure which is carrying the electrical power.

The power pick up arrangement may comprise a toroidal inductive coupling provided around the downhole metallic structure—for example provided around liner. In such an arrangement the liner diameter may be reduced locally to incorporate the toroid with in the diameter of the rest of the liner. This has the advantage of minimising the diameter of the hole to be drilled but has the disadvantage of reducing internal diameter which could restrict flow of product or accessibility of tools.

As will be appreciated a toroidal inductive coupling typically comprises a generally ring shaped portion of magnetic material carrying a winding which is wound around the magnetic material so as to pass through the central aperture of the toroid multiple times.

In another example the power pick up arrangement may comprise a downhole tool, provided within the metallic structure. The downhole tool may comprise a spaced pair of contacts for contacting the metallic structure at spaced locations such that a portion of current flowing in the metallic structure can flow through the tool.

The power pick up arrangement may comprise a pick up tool electrically connected across a break in the downhole metallic structure. The break may comprise an insulation joint or an axial gap in the downhole metallic pipe. For example an axial gap may be milled in production tubing, liner or casing to provide an uncased section of borehole and the pick up tool may be connected across this. This uncased section may or may not be filled with sealing material such as cement.

In some cases the pick up tool may comprise a conduction path for electrically connecting together sections of downhole metallic pipe on either side of the break. This can allow a controlled current flow path between the two sections such that current can still reach portions of the structure below the break in the metallic structure, whilst pick-up and transmission efficiencies at the pick up tool can be enhanced.

The conduction path may be a controllable conduction path such that the impedance of the conduction path is controllably variable. This can allow control of the proportion of current in the downhole structure which is able to pass the break in the metallic structure. The controllable conduction path may comprise a switch—allowing short circuit and open circuit conditions between sections of metallic structure on either side of the break and/or variable impedance means allowing introduction of a selected non-zero impedance between sections of metallic structure on either side of the break.

With such arrangements a plurality of power pick up arrangements may be located on a branch of metallic structure with each, if desired, connected across a respective break in the metallic structure.

At the simplest level the power transfer arrangement may comprise a direct connection of the cable to the metallic structure. However efficiency of such a situation is low because there is very poor impedance matching. The impedance of the cable may be say 70Ω whereas that of the structure may be in the order of 1 mΩ.

According to another aspect of the invention there is provided a downhole power transfer system for use in a well installation as defined above.

In one set of embodiments, the power transfer arrangement may comprise a toroidal inductive coupling provided around the downhole metallic structure—for example provided around production tubing.

Where the power transfer arrangement comprises a toroidal inductive coupling, this is an advantage if the toroidal inductive coupling is provided around production tubing since this makes it straight forward for the cable to run in the annulus surrounding the production tubing. On the other hand efficiency can be adversely affected when the inductive coupling is provided around the production tubing.

Insulation means may be provided in the region of the power transfer arrangement for insulating the metallic structure, to which the power transfer arrangement is arranged to transfer power, from its surroundings. Insulation means may be provided in the region of the power transfer arrangement for insulating the production tubing from its surroundings. In such a case typically the surroundings will comprise casing within which production tubing is provided.

The insulation means may comprise insulating spacers for spacing the production tubing from the casing in the region of the power transfer arrangement. The spacers may be mounted on the production tubing. The insulation means may comprise an insulating layer or coating provided on the metallic structure.

Such insulation can help the effectiveness with which electrical power is transferred onto the metallic structure.

The power transfer arrangement may be disposed adjacent to a packer in the installation. The power transfer arrangement may be disposed less than 100 m from the packer, preferably less than 30 m from the packer, more preferably still less than 10 m from the packer.

Insulation may be applied to the packer and/or to metallic structure adjacent to the packer to insulate the packer and/or metallic structure from the surroundings.

In another set of embodiments, the power transfer arrangement is provided at a region where the well installation comprises production tubing provided within casing and the power transfer arrangement comprises a first solenoidal coil which is provided around the production tubing and to which the cable is connected, a second solenoidal coil provided around the casing at a location which is aligned with the first solenoidal coil and a toroidal inductive coupling which is provided around the casing such that in use the first solenoidal coil is driven with current via the cable inducing current in the second solenoidal coil which in turn drives the toroidal inductive coupling which induces a current in the casing for onward transport down into the well via the metallic structure.

This arrangement can provide enhanced efficiency if the metallurgy of the casing in the region of the coil is appropriately selected. In particular if casing other than standard steel casing is used.

Note that here alignment of the first and second solenoidal coils does not require complete overlap, nor need the first and second coils necessarily have the same length. Some alignment is required to give good induction of current in the second coil, and the more accurately aligned the coils are, the better the efficiency of the induction. It is currently preferred if the first solenoidal coil is longer than the second solenoidal coil. It has been found that this leads to better coupling.

Preferably the well installation comprises a non-ferrous casing section and a non-ferrous production tubing section in the region of the first and second solenoidal coils so that the first and second solenoidal coils are respectively provided around the non-ferrous production tubing section and non-ferrous casing section.

This can help efficiency of induction of current in the second solenoidal coil.

In another set of embodiments, the power transfer arrangement comprises an electrode arranged to contact with the surroundings of the bore hole and to which the cable is electrically connected to allow a flow of current from the cable to the surroundings, a toroidal inductive coupling provided around the cable or an electrical connection between the cable and the electrode such that current flow to the electrode induces current flow in the inductive coupling, and electrical power transmission means arranged to be driven by current induced in the toroidal inductive coupling and arranged for applying electrical power to the downhole metallic structure.

In another set of embodiments, the power transfer arrangement comprises an electrode arranged to contact with the surroundings of the bore hole and to which the cable is electrically connected to allow a flow of current from the cable to the surroundings, electrical power transmission means arranged for applying electrical power to the downhole metallic structure, and an inductive coupling for inductively coupling between the cable or an electrical connection between the cable and the electrode on the one hand and the electrical power transmission means on the other hand such that the electrical power transmission means is arranged to be driven by current induced in the inductive coupling by current flow to the electrode.

The inductive coupling may be a toroidal inductive coupling provided around the cable or an electrical connection between the cable and the electrode. Alternatively the inductive coupling may comprise a multi-turn transformer arrangement with the cable connected to a primary winding and the electrical power transmission means connected to a secondary winding.

These arrangements can work better than those further above when standard casing material is used, thus, for example, this arrangement may be particularly relevant for corrosive environments.

The electrical power transmission means may comprise a transmitter which has one terminal connected to the electrode and one terminal connected to the downhole metallic structure.

The power transmission means may be provided at a region where the well installation comprises production tubing provided with casing. The cable may run within the annulus between the production tubing and the casing.

The electrode may be provided outside of the casing. The electrode may be provided on an outside surface of the casing. The cable may electrically contact with the casing at the location of the power transmission means and the power transmission means may comprise an electrical contact member outside of the casing, which is electrically connected to the casing and the electrode such that there is an electrical conduction path from the cable, through the casing and electrical contact member to the electrode.

Preferably the power delivery apparatus is arranged so that the current flowing to the electrode is alternating current with a frequency selected to cause the skin effect to increase the impedance of a current flow path into the metallic structure in the region of the electrode so as to preferentially cause current flow via the electrode.

Preferably the power delivery apparatus is arranged so that the current flowing to the electrode is alternating current with a first frequency and arranged so that the current caused to flow in the metallic structure by the electrical power transmission means is an alternating current with a second frequency which is lower than the first frequency.

This means that where flow of current into the metallic structure is undesirable the skin effect will tend to be higher increasing the impedance to any current flowing into the metallic structure whilst where flow of current into the metallic structure is desirable the skin effect will tend to be lower reducing the impedance to any current flowing into the metallic structure.

In an example the first frequency may be greater than 100 Hz, or greater than 1 kHz, or greater than 10 kHz.

In an example the second frequency may be less than 1 Hz, or less than 10 Hz, or less than 100 Hz.

The chosen frequencies may depend on the materials/properties of the metallic structure in the region of the power transfer arrangement.

The power source may be arranged to apply current with the selected/first frequency to the cable.

Alternatively the power transfer arrangement may comprise a frequency convertor for converting current received from the cable to current with the selected/first frequency for application to the electrode.

The transmitter may be a low frequency transmitter.

The power transfer arrangement may comprise a rectifier for rectifying current induced in the toroidal inductive coupling before supply to the electrical power transmission means.

In another set of embodiments the power transfer arrangement comprises an electrical heater connected to the cable and disposed inside a tubular portion of the downhole metallic structure for heating the tubular portion from the inside, at least one thermo-electric device disposed outside the tubular portion for generating electricity in response to a temperature gradient created by the heater, and electrical power transmission means arranged for applying electrical power to the downhole metallic structure from outside of the tubular portion using electricity generated by the at least one thermo-electric device. Here heat is used to transfer energy/power from inside a tubing portion to outside a tubing portion. Electrical power may then be more efficiently applied to the downhole structure. The electrical power transmission means may comprise a toroidal inductive coupling arranged around the tubing portion—which typically will be casing.

According to a further aspect of the present invention there is provided a method of delivering power to a tool downhole in a well installation from a surface power source, the well installation comprising downhole metallic structure running down into a borehole and the method comprising the steps of:

using an electrical cable for carrying electrical power from the surface power source to a first downhole location;

transferring electrical power carried by the electrical cable onto the downhole metallic structure at the first location for onward conduction; and picking up electrical power from the downhole metallic structure at a second downhole location for supply to the downhole tool.

The method may comprise the further step of ensuring that beyond the second location, the downhole metallic structure extends beyond a production zone of the well, optionally, into a conductive zone.

The method may comprise using downhole power delivery apparatus as defined above. The method may comprise using a power transfer arrangement as defined above and/or using a power pick up arrangement as defined above.

According to a further aspect of the present invention there is provided downhole power delivery apparatus for delivering electrical power from a surface power source to tool downhole in a well installation which comprises downhole metallic structure running down into a borehole, the downhole power delivery apparatus comprising an electrical cable for carrying electrical power from the surface power source, a power transfer arrangement and a power pick up arrangement, the cable being arranged for running down into the borehole together with the metallic structure to the power transfer arrangement which is to be provided at a first down hole location for transferring electrical power carried by the electrical cable onto the downhole metallic structure for onward conduction, and the power pick up arrangement being arranged to be disposed at a second downhole location, spaced from the first, for picking up electrical power from the downhole metallic structure for supply to the downhole tool.

The power pick up arrangement may comprise a toroidal inductive coupling for provision around the downhole metallic structure—for example provision around production tubing.

The power pick up arrangement may comprise a pick up tool electrically connected across a break in the downhole metallic structure. The break may comprise an insulation joint or an axial gap in the downhole metallic pipe. For example an axial gap may be milled in production tubing, liner or casing to provide an uncased section of borehole and the pick up tool may be connected across this. This uncased section may or may not be filled with sealing material such as cement.

In some cases the pick up tool may comprise a conduction path for electrically connecting together sections of downhole metallic pipe on either side of the break. This can allow a controlled current flow path between the two sections such that current can still reach portions of the structure below the break in the metallic structure, whilst pick-up and transmission efficiencies at the pick up tool can be enhanced.

The conduction path may be a controllable conduction path such that the impedance of the conduction path is controllably variable. This can allow control of the proportion of current in the downhole structure which is able to pass the break in the metallic structure. The controllable conduction path may comprise a switch—allowing short circuit and open circuit conditions between sections of metallic structure on either side of the break and/or variable impedance means allowing introduction of a selected non-zero impedance between sections of metallic structure on either side of the break.

With such arrangements a plurality of power pick up arrangements may be located on a branch of metallic structure with each, if desired, connected across a respective break in the metallic structure.

In one set of embodiments, the power transfer arrangement may comprise a toroidal inductive coupling for provision around the downhole metallic structure—for example provision around production tubing.

The downhole power delivery apparatus may comprise insulation means for provision in the region of the power transfer arrangement for insulating the metallic structure to which the power transfer arrangement is arranged to transfer power from its surroundings.

The insulation means may comprise insulating spacers for spacing the production tubing from the casing in the region of the power transfer arrangement. The insulation means may comprise a layer or coating for application to metallic structure.

In another set of embodiments, the power transfer arrangement is for provision at a region where the well installation comprises production tubing provided within casing and the power transfer arrangement comprises a first solenoidal coil for location around the production tubing and to which the cable is to be connected, a second solenoidal coil for location around the casing at a location which is aligned with the first solenoidal coil and a toroidal inductive coupling which is for location around the casing such that in use the first solenoidal coil is driven with current via the cable inducing current in the second solenoidal coil which in turn drives the toroidal inductive coupling which induces a current in the casing for onward transport down into the well via the metallic structure.

In another set of embodiments, the power transfer arrangement comprises an electrode arranged to contact with the surroundings of the bore hole and to which the cable is electrically connectable to allow a flow of current from the cable to the surroundings, a pick up winding which is inductively coupled with the cable or an electrical connection between the cable and the electrode such that current flow to the electrode induces current flow in the pick up winding, and electrical power transmission means arranged to be driven by current induced in the pick up winding and arranged for applying electrical power to the downhole metallic structure.

The power transfer arrangement may comprise a transformer with the cable or an electrical connection between the cable and the electrode forming a primary winding and the pick up winding forming a secondary winding.

The cable or electrical connection between the cable and the electrode may comprise a simple connection to the electrode and thus act as a single turn winding. The cable or electrical connection between the cable and the electrode may comprise a multi-turn winding.

The pick up winding will typically comprise a multi-turn winding.

The turns ratio of the transformer can be chosen to give impedance matching.

The power transfer arrangement may comprise a toroidal inductive coupling which comprises the pick up winding and through which the cable or electrical connection between the cable and the electrode passes. Where the cable or electrical connection between the cable and the electrode comprises a multi-turn winding, this may be wound on the toroidal coupling.

In another set of embodiments, the power transfer arrangement comprises an electrode arranged to contact with the surroundings of the bore hole and to which the cable is electrically connectable to allow a flow of current from the cable to the surroundings, a toroidal inductive coupling for provision around the cable or an electrical connection between the cable and the electrode such that current flow to the electrode induces current flow in the inductive coupling, and electrical power transmission means arranged to be driven by current induced in the toroidal inductive coupling and arranged for applying electrical power to the downhole metallic structure.

The cable may be connected to a first inside surface of a run of downhole metallic pipe, say casing or liner, of the downhole structure and the electrode may be disposed outside the run of downhole metallic pipe.

The electrode may be connected to a second outside surface of the run of downhole metallic pipe via said cable or electrical connection.

As the frequency of the applied power signals is increased resistance of the run of downhole metallic pipe due to skin effect will also increase whilst the reactive impedance of the electrode will decrease thereby preferentially directing current through the toroidal transformer. To maximise power transfer the frequency may be increased until the rate of increase in loss in the cable equals the rate of increase of efficiency due to the preferential directing of power through the toroidal transformer.

The electrical power transmission means may comprise a transmitter which has one terminal for connection to the electrode and one terminal for connection to the downhole metallic structure.

Preferably the power delivery apparatus is arranged so that the current flowing to the electrode is alternating current with a first frequency and arranged so that the current caused to flow in the metallic structure by the electrical power transmission means is an alternating current with a second frequency which is lower than the first frequency.

The power source may be arranged to apply current with the selected/first frequency to the cable.

Alternatively the power transfer arrangement may comprise a frequency convertor for converting current received from the cable to current with the selected/first frequency for application to the electrode.

The transmitter may be a low frequency transmitter.

The power transfer arrangement may comprise a rectifier for rectifying current induced in the toroidal inductive coupling before supply to the electrical power transmission means.

According to another aspect of the invention there is provided a downhole power transfer system for transferring electrical power from inside a run of downhole metallic pipe provided in a borehole to outside the run of downhole metallic pipe, comprising a source of electrical power which is electrically connected or connectable to a first, inside, surface of the run of downhole metallic pipe, an electrode disposed outside of the run of downhole metallic pipe which is arranged to contact with the surroundings of the borehole and is electrically connected or connectable via a conducting portion to a second, outside, surface of the run of downhole metallic pipe to allow a flow of current from the source of electrical power to the surroundings via the electrode, and a toroidal inductive coupling provided around the conducting portion such that current flow to the electrode induces current flow in windings of the inductive coupling for use as electrical power outside of the run of downhole metallic pipe.

According to another aspect of the invention there is provided a downhole power transfer system for transferring electrical power from inside a run of downhole metallic pipe provided in a borehole to outside the run of downhole metallic pipe, comprising a source of electrical power which is electrically connected or connectable to a first, inside, surface of the run of downhole metallic pipe, an electrode disposed outside of the run of downhole metallic pipe which is arranged to contact with the surroundings of the borehole and is electrically connected or connectable via a conducting portion to a second, outside, surface of the run of downhole metallic pipe to allow a flow of current from the source of electrical power to the surroundings via the electrode, and a pick up winding which is inductively coupled with the conducting portion such that current flow to the electrode induces current flow in the pick up winding for use as electrical power outside of the run of downhole metallic pipe.

According to another aspect of the invention there is provided a downhole power transfer arrangement for transferring electrical power from inside a run of downhole metallic pipe provided in a borehole to outside the run of downhole metallic pipe, in situations where a source of electrical power is electrically connectable to a first, inside, surface of the run of downhole metallic pipe, the arrangement comprising, an electrode for location outside of the run of downhole metallic pipe which is arranged to contact with the surroundings of the borehole, a conducting portion for electrically connecting the electrode to a second, outside, surface of the run of downhole metallic pipe, and a pick up winding which is inductively coupled with the conducting portion such that current flow to the electrode induces current flow in the pick up winding for use as electrical power outside of the run of downhole metallic pipe.

The power transfer arrangement may comprise a transformer with the conducting portion forming a primary winding and the pick up winding forming a secondary winding.

The conducting portion may comprise a simple connection to the electrode and thus act as a single turn winding.

The conducting portion may comprise a multi-turn winding.

The pick up winding will typically comprise a multi-turn winding.

The turns ratio of the transformer can be chosen to give impedance matching.

The power transfer arrangement may comprise a toroidal inductive coupling which comprises the pick up winding and through which the conducting portion passes. Where the conducting portion comprises a multi-turn winding, this may be wound on the toroidal coupling.

According to another aspect of the invention there is provided a downhole power transfer arrangement for transferring electrical power from inside a run of downhole metallic pipe provided in a borehole to outside the run of downhole metallic pipe, in situations where a source of electrical power is electrically connectable to a first, inside, surface of the run of downhole metallic pipe, the arrangement comprising, an electrode for location outside of the run of downhole metallic pipe which is arranged to contact with the surroundings of the borehole, a conducting portion for electrically connecting the electrode to a second, outside, surface of the run of downhole metallic pipe, and a toroidal inductive coupling provided around the conducting portion such that current flow to the electrode induces current flow in windings of the inductive coupling for use as electrical power outside of the run of downhole metallic pipe.

As mentioned above as the frequency of the applied power signals is increased resistance of the run of downhole metallic pipe due to skin effect will also increase whilst the reactive impedance of the electrode will decrease thereby preferentially directing current through the toroidal transformer. Preferably relatively high frequency power signals are applied to the downhole metallic pipe with this type of power transfer arrangement. The frequency of the applied power signals may be at least 1 kHz, more preferably at least 10 kHz. The frequency of the signals may be in the VLF (Very Low Frequency) frequency range.

In another set of embodiments the power transfer arrangement comprises an electrical heater connectable to the cable and disposable inside a tubular portion of the downhole metallic structure for heating the tubular portion from the inside, at least one thermo-electric device disposable outside the tubular portion for generating electricity in response to a temperature gradient created by the heater, and electrical power transmission means arranged for applying electrical power to the downhole metallic structure from outside of the tubular portion using electricity generated by the at least one thermo-electric device. Here heat is used to transfer energy/power from inside a tubing portion to outside a tubing portion. Electrical power may then be more efficiently applied to the downhole structure. The electrical power transmission means may comprise a toroidal inductive coupling arranged around the tubing portion—which typically will be casing.

Note that in general each of the optional features following each of the aspects of the invention above is equally applicable as an optional feature in respect of each of the other aspects of the invention and could be re-written after each aspect with any necessary changes in wording. Not all such optional features are re-written after each aspect merely in the interests of brevity.

Embodiments of the present invention will now be described, by way of example only, with reference to the accompanying drawings in which:

FIG. 1 schematically shows a well installation including power delivery apparatus;

FIG. 2 schematically shows a power pick up arrangement which may be used in power delivery apparatus of the type shown in FIG. 1;

FIG. 3 schematically shows a power transfer arrangement which may be used in power delivery apparatus of the type shown in FIG. 1;

Figure 7:
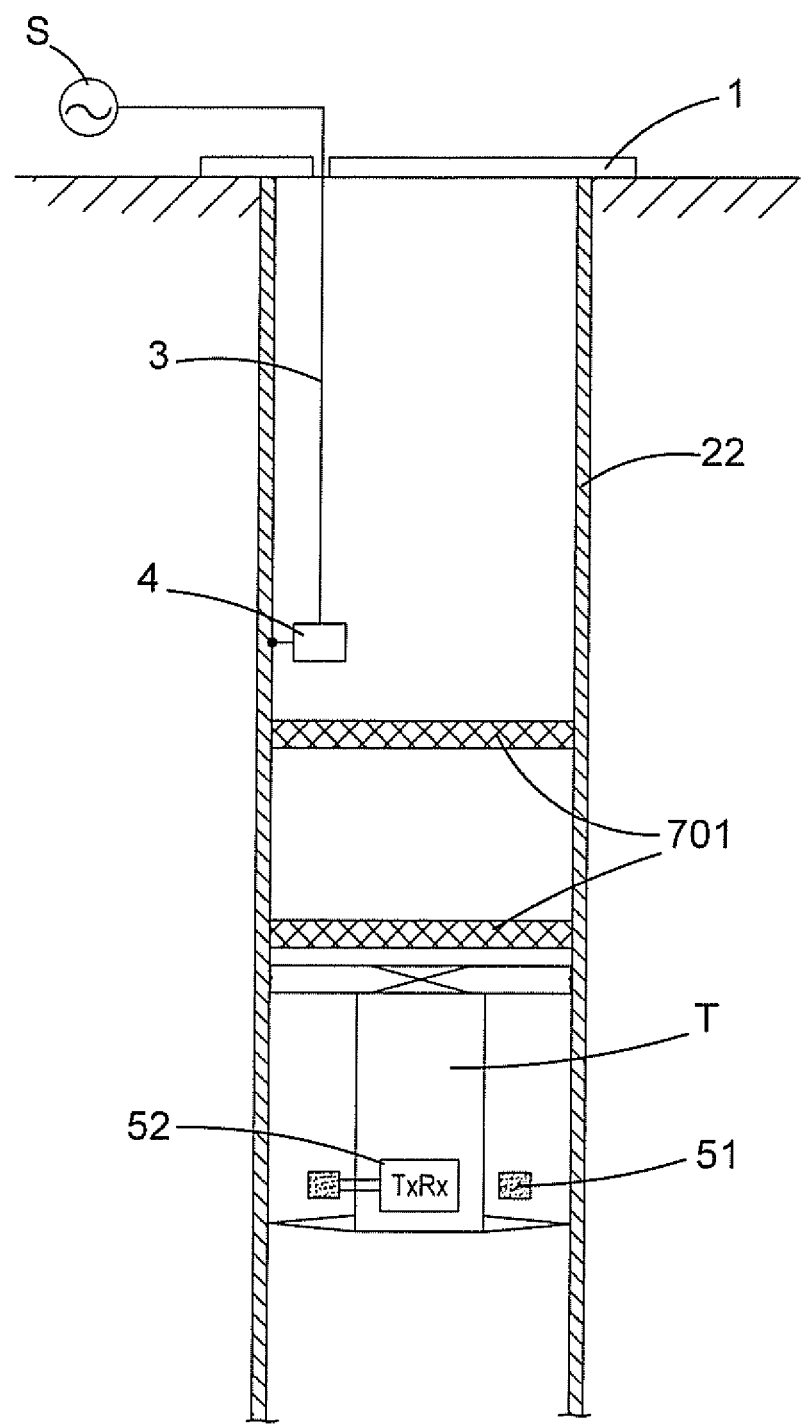
Figure 8:
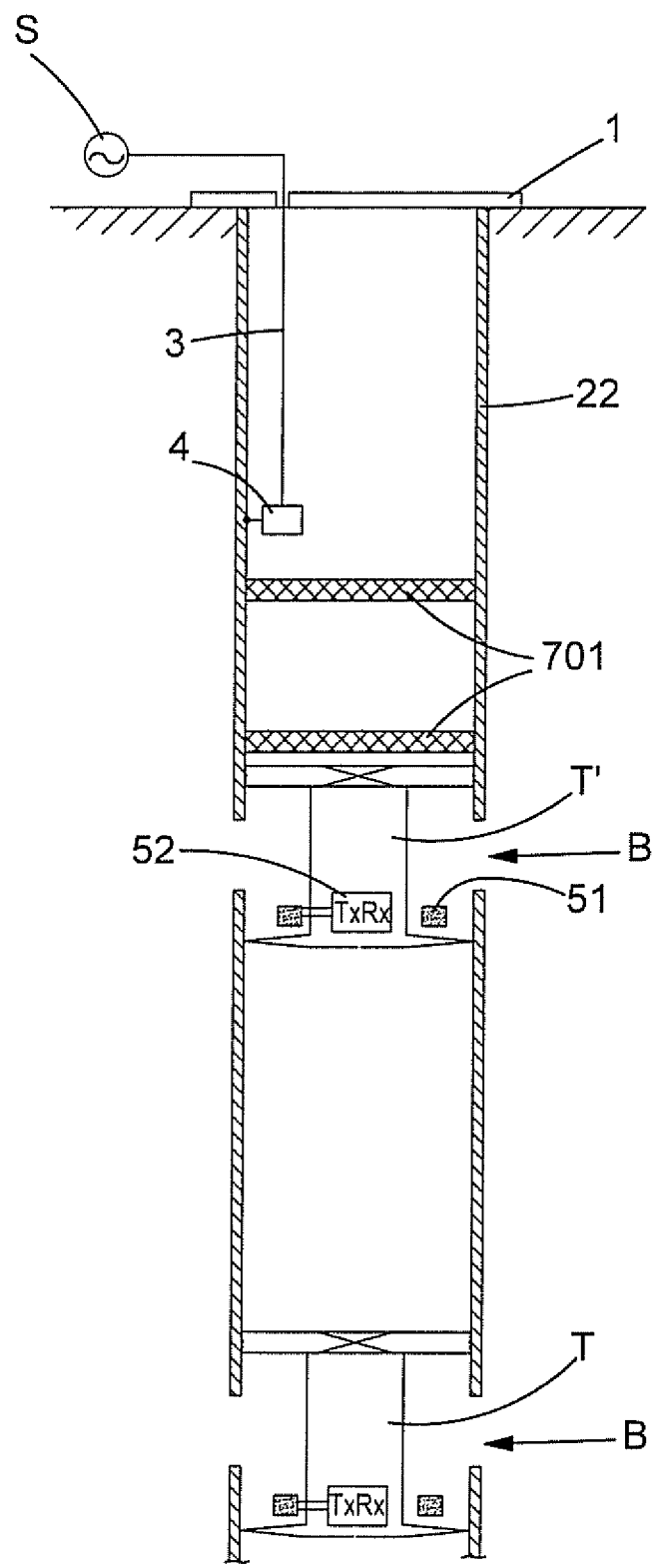

FIG. 7 schematically shows an abandoned well installation including power delivery apparatus; and FIG. 8 schematically shows an abandoned well installation including an alternative power delivery apparatus.

Figure 1:
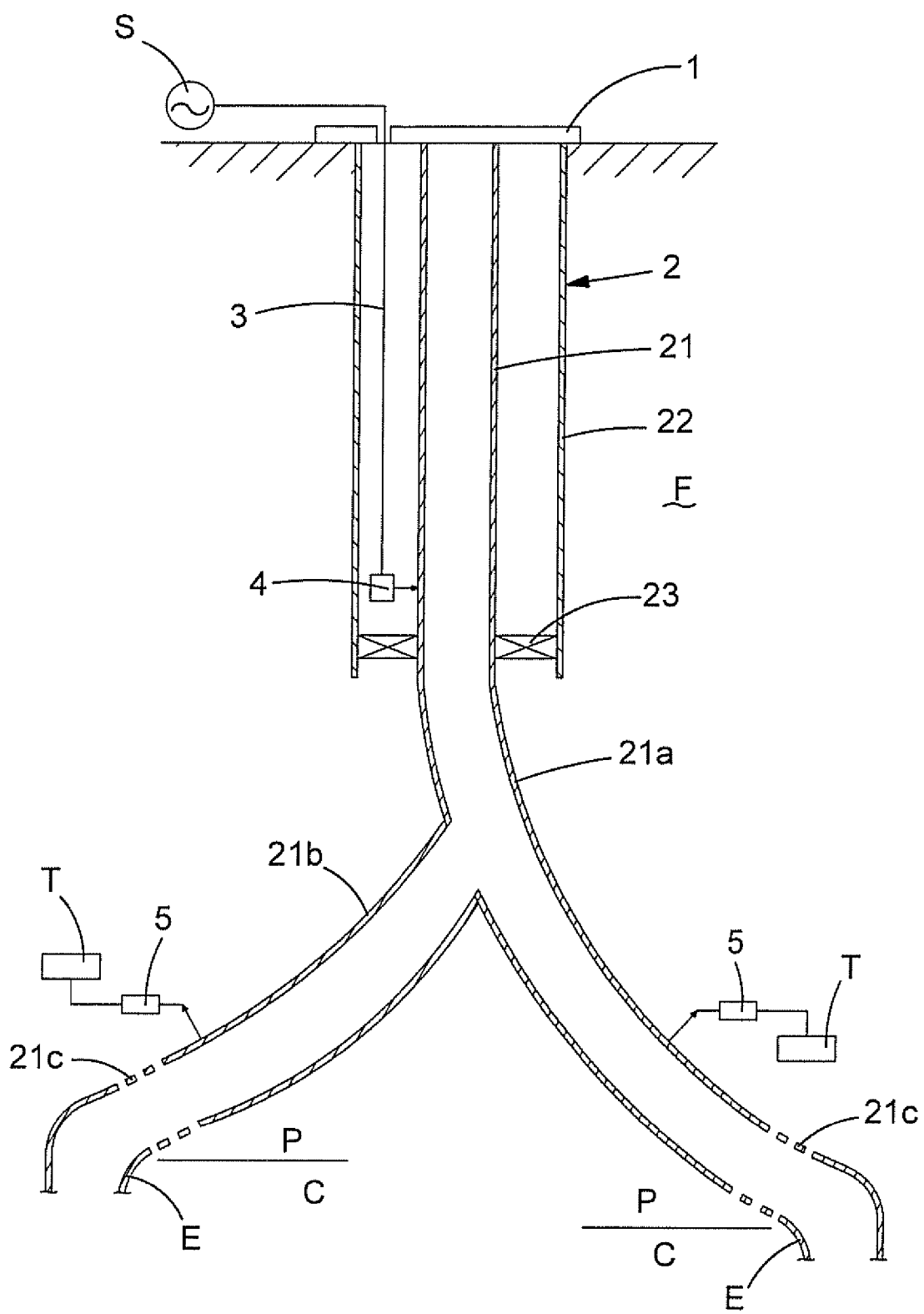

FIG. 1 schematically shows a well installation comprising a well head 1 and downhole metallic structure 2 descending down into a borehole provided in the formation F. In this case, the downhole metallic structure 2 comprises production tubing 21, casing 22 and a packer 23 provided between the production tubing 21 and the casing 22 at a region where the casing 22 terminates. The well installation of FIG. 1 is a multi-lateral well installation and as such there is a main bore and a lateral bore. One set of production tubing 21a is provided throughout the main bore and another set of production tubing 21b is providing in the lateral bore.

The production tubing 21a, 21b in both the main bore and the lateral bore proceed down to a production zone P where product i.e. oil and/or gas is present in the formation F and a perforated portion of production tubing 21c is provided in this region to allow product to flow out of the formation F and into the production tubing 21a, 21b.

Below the production zone P in both bores, there will be a conductive zone C where water is present in the formation F below the level of the product. For production alone there is no need for the production tubing 21a, 21b to extend into this conductive zone C. However, in the present well installation, the production tubing 21a, 21b does extend into this conductive zone C. As such, there are respective extension portions E of the production tubing 21 which extend into the conductive zone C. This can help in the efficiency of delivery of power in present techniques as will be described in more detail below. Note that in other circumstances rather than the extension portion E extending into the conductive zone C, it may simply extend further into the reservoir. This extended "tail" of tubing can still help with delivery of power. So in such a case, there will just be an extension portion of tubing beyond the production zone, that is beyond the perforated portion of tubing 21c. Typically this will mean drilling further along the line of the production zone without having to drill further down.

The well installation comprises power delivery apparatus comprising a cable 3, a power transfer arrangement 4 and a power pick up arrangement 5 for transmitting power from a surface power source S to a downhole tool T. In the present embodiment, a first power pick up arrangement 5 is provided in the main bore and a second power pick up arrangement 5 is provided in the lateral bore. Each of these is for providing power to a respective tool T.

With the present power delivery apparatus, electrical power from the surface power source S is carried downhole by the cable 3 to a first downhole location at which the power transfer arrangement 4 is provided. Here the power transfer arrangement 4 applies the electrical power to the downhole metallic structure 2. This occurs at a region close to but above the packer 23. From here the electrical power is transmitted further downhole into the well by the metallic structure 2 itself and reaches the power pick up arrangement 5 in the main bore 21a on the one hand, and the corresponding power pick up arrangement 5 in the lateral bore 21b on the other hand. The power pick up arrangement 5 then extracts the electrical power from the metallic structure 2 at its location and supplies this to the respective tool T. Of course, at the tool T the electrical power may be stored or used for whatever desired purpose is appropriate.

Figure 2:
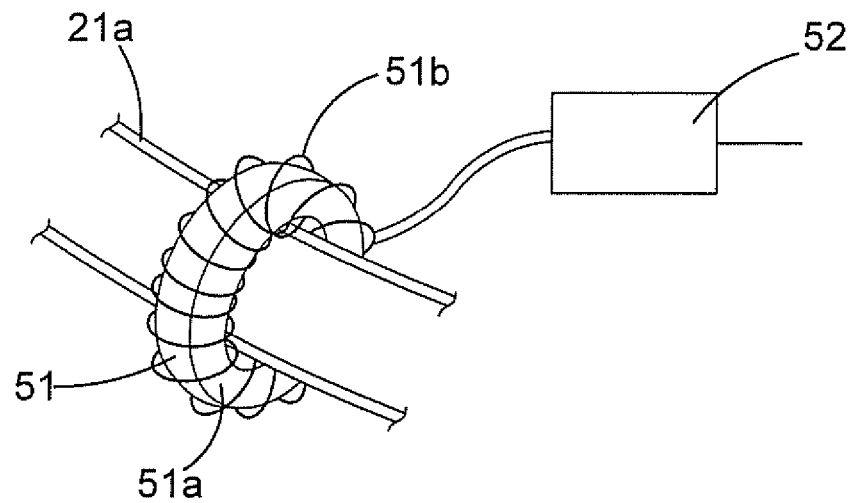

In the present embodiment, each power pick up arrangement 5 comprises a toroidal inductive coupling 51 as schematically shown in FIG. 2. Each toroidal inductive coupling 51 comprises a ring-like portion of magnetic material 51a which is provided around the metallic structure, in particular the production tubing 21a, 21b at the pick up location, and a winding 51b coiled around this piece of magnetic material 51a such that it passes through the central aperture of the toroid between the portion of magnetic material 51a and the production tubing 21a, 21b multiple times. This winding 51b is connected to a central unit 52 of the pick up arrangement 5 which in turn can supply power to the corresponding tool T. The central unit 52 may comprise rechargeable batteries, capacitors, or other energy storage means to be charged by the picked up current if appropriate, and of course it may supply energy to more than one tool T at that location.

Other forms of electrical power pick up arrangements 5 might be used but the use of an inductive toroidal coupling is preferred. For example, a generally less preferred option would be to provide an isolation joint between sections of the production tubing and pick up power across this.

Note that because the extension portion E extends down into the conductive portion of the formation F past the location of the pick up arrangement 5, there is an enhanced path to earth for current flowing in the metallic structure 2 towards that extension region E from the point at which it is applied by the power transfer means 4. Thus the provision of the extension region E serves to draw current along the metallic structure 2, reducing the amount of power which is lost to the surroundings and hence increasing the efficiency of the system and the amount of power that may be collected by the power pick up arrangement 5. A similar but less pronounced effect can be achieved where the extension portion E is provided in the reservoir.

The power transfer arrangement may be implemented in various ways.

Figure 3:
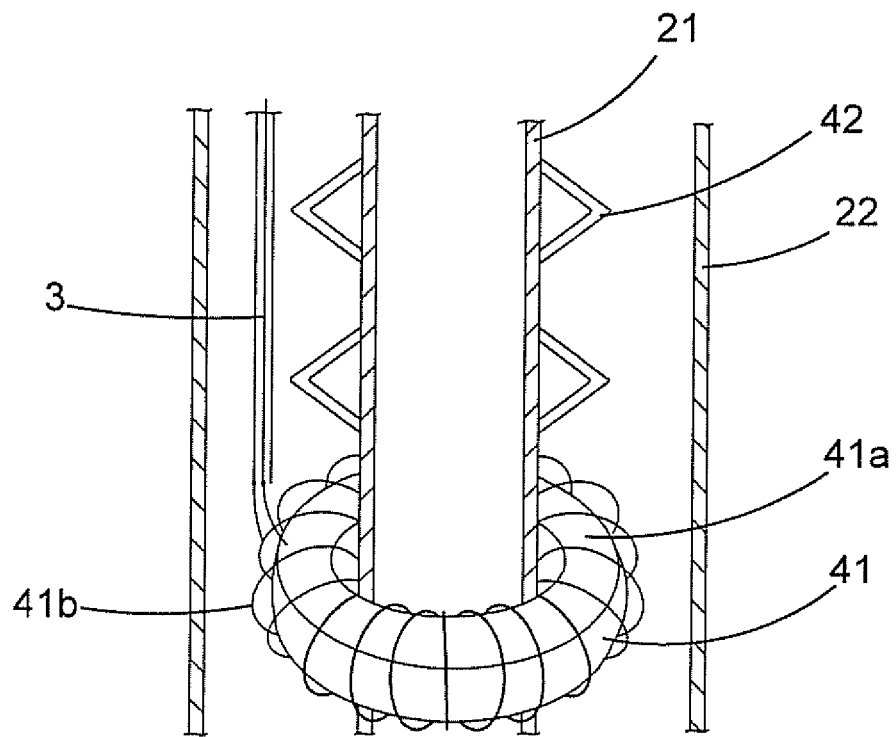

FIG. 3 shows a first version of a power transfer arrangement 4 which may be used in the arrangement of FIG. 1.

Here again a toroidal inductive coupling 41 is used. In this case, the portion of magnetic material 41a is provided around the production tubing 21 and the corresponding winding 41b wound around this. The ends of the winding 41b are connected to the cable 3 which, for example, may be a coaxial cable as schematically illustrated in FIG. 3. In this implementation, the power transfer arrangement 4 also comprises a plurality of insulating spacers 42, which are mounted on the production tubing 21 in the region of the toroidal conductive coupling 41 to keep the production tubing 21 spaced from the casing 22 in that region. This helps avoid contact between the casing 22 and production tubing 21 in the region of the toroidal inductive coupling 41 which would tend to cause short circuits and reduce the effectiveness of injection of electrical current into the production tubing 21 for transport further downhole. Optionally a conductive centraliser (not shown) may be provided at a location above that where the insulating spacers 42 are provided. This provides a known contact location between the production tubing 21 and casing 22 which can be preferable. Without this, contact will occur at some point above the spacers 42, because of the nature of well installations.

With this arrangement, as current is supplied from the surface power source S along the cable 3, the toroidal inductive coupling 41 serves to induce a corresponding current in the production tubing 21 which propagates further downhole. It will be appreciated that this is far from a perfect current transmission situation and current will also propagate back up the production tubing 21. However, the present technique can still achieve an effective transfer of power downhole and it should be noted that once in a region past the packer 23 (see FIG. 1), the resistivity of the formation F is much higher than the resistivity seen in the region above the packer 23 where the other downhole metallic structure is present and thus losses to the surroundings once in the region below the packer 23 are lower. Thus, by applying the electrical power to the metallic structure at a location just above the packer 23, an extremely lossy part of the metallic structure 2 has been avoided.

With the implementation of the power transfer arrangement as shown in FIG. 3, there may also be benefit in providing further insulation between the metallic structure 2 and the surroundings in the region of the power transfer arrangement 4. In particular, it may be desirable to provide insulation between the casing 22 and the surroundings in the region between the toroidal inductive coupling 41 and the packer 23 (see FIG. 1) as well as possibly to insulate the packer 23 itself from the surroundings and a portion of the production tubing 21 from the surroundings at a region where this extends beyond the packer 23. Provision of insulation in these regions can help reduce losses to the surroundings at this relatively lossy zone compared with the less lossy zone as one progresses further along the production tubing down into the well. Insulation could be provided on all metallic structure below the power transfer arrangement and efficiency would improve as a result, but of course this will be more expensive/difficult than providing insulation at more limited locations.

Figure 4:
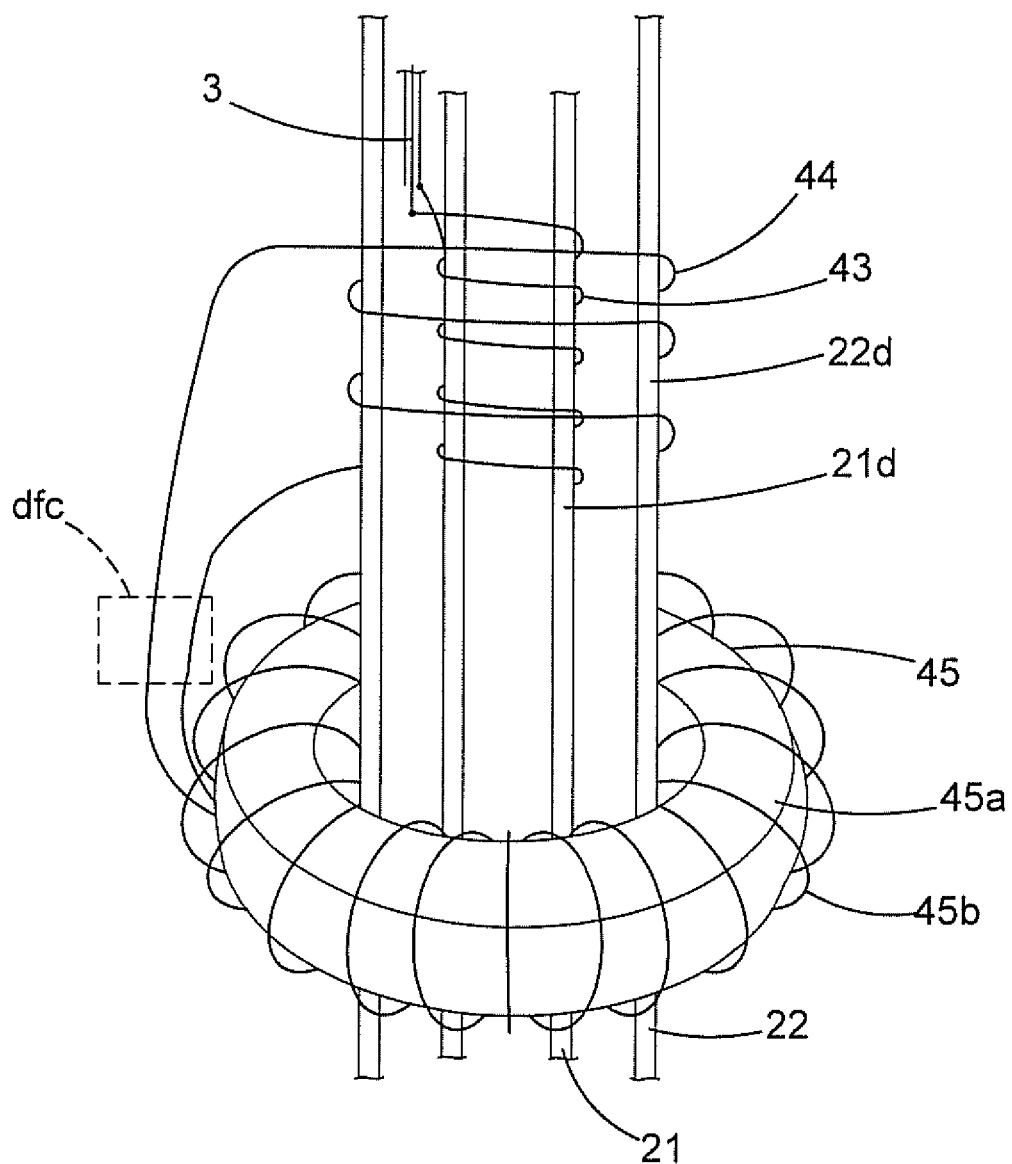
FIG. 4 shows an alternative power transfer arrangement which may be used in power delivery apparatus of the type shown in FIG. 1.

FIG. 4 shows an alternative implementation for the power transfer arrangement 4 which can be used in an arrangement as shown in FIG. 1. Here again, the cable 3 is run in the annulus between the production tubing 21 and the casing 22 until it reaches the power transfer arrangement 4. The cable 3 is connected to a first solenoidal winding 43 which is wound around the production tubing 21. A second solenoidal winding 44 is wound around the outside of the casing 22 and positioned so as to be aligned with the first solenoidal winding 43. The second solenoidal winding 44 is connected to a toroidal inductive coupling 45 which is provided around the casing 22. In particular, the second solenoidal winding 44 is connected to a winding 45b provided on the magnetic material portion 45a of the respective toroidal inductive coupling 45. In operation, current is delivered from the cable 33 into the first solenoidal winding 43, which in turn generates a current in the second solenoidal winding 44 which serves to drive current through the winding 45b of the toroidal inductive coupling 45 so inducing current in the metallic structure, in particular in the casing 22 and production tubing 21 which can propagate further down into the well.

To enhance this effect, the production tubing 21 and casing 22 both include special tubing sections respectively 21d and 22d in the region of the solenoidal coils 43 and 44 which are of a metallic material chosen to allow induction between the solenoidal coils 43 and 44. Thus the special tubing sections 21d, 22d will be non-ferrous and ideally have $\mu_r$ (relative permeability) equal to or approximately equal to 1.

Note that in a practical situation, due to temperature changes and so on, there may be relative axial movement of the production tubing 21 relative to the casing 22 in the region of the power transfer arrangement 4. Thus in the present implementation account of this should be taken. Thus one possibility is to have the first solenoidal coil 43 of greater axial length than the second solenoidal coil 44 and arrange the coils 43, 44 so that with the production tubing 21 in a neutral/rest position relative to the casing 22, the first solenoidal coil 43 is mid-way along the length of the second solenoidal coil 44 such that axial movement between the two solenoidal coils 43, 44 still leaves a good degree of overlap there between. Note that perfect alignment between the first and second solenoidal coils 43, 44 is not required in order to obtain induction there between.

Figure 5:
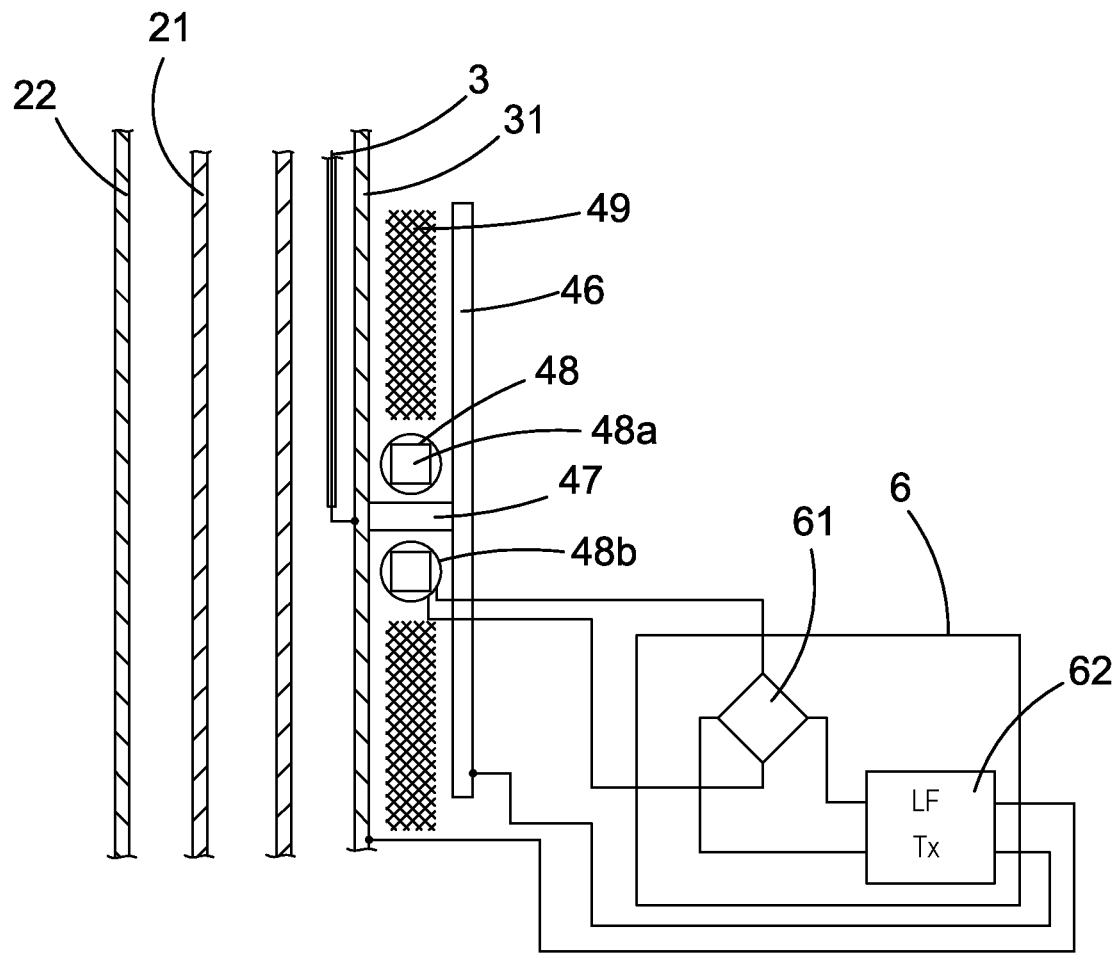
FIG. 5 shows another alternative power transfer arrangement which may be used in power delivery apparatus of the type shown in FIG. 1.

FIG. 5 shows yet another implementation of a power transfer arrangement which may be used in an arrangement such as that shown in FIG. 1. Here, the power transfer arrangement comprises an electrode 46 which is provided on an outer surface of the casing 22 so as to be in contact with the surroundings. This electrode 46 is connected to the casing 22 via an electrical contact member 47 but otherwise is insulated therefrom by insulation 49. The electrode 46 may be arranged as a sleeve-like outer layer around the casing 22.

A toroidal inductive coupling 48 of the same general form as that shown in FIGS. 2, 3 and 4 is provided around the electrical contact member 47 and the cable 3 is electrically connected to the casing 21 in the region of the electrical contact member 47 so that when electrical current is suppled via the cable 3, this passes through the casing wall 31 into the electrical contact member 47 and out into the electrode 46 where current can flow into the surroundings.

The electrode is designed so as to maximise the current flow through the electrical contact member 47 and current flowing through this contact member 47 serves to induce current in a winding 48a of the toroidal inductive coupling 48 provided around its respective ring of magnetic material 48b.

The winding 48a of the toroidal inductive coupling 48 is connected to a central unit 6 of the power transfer arrangement. The central unit 6 comprises a rectifier 61 to which the winding 48a is connected and a low frequency transmitter 62 which is connected to the output of the rectifier 61. The outputs of the low frequency transmitter 62 are connected to the electrode 46 and the metallic structure 2 in this embodiment (in particular, the casing 22) for applying low frequency power signals to the metallic structure 2 for onward transmission down into the well.

In the present implementation, the surface power source S is arranged to supply an alternating current signal with a high frequency to the cable 3 such that this flows through the electrical contact member 47 and out the surroundings through the electrode 46. Good capacitive coupling can be arranged between the electrode 46 and the surroundings such that there is a low impedance path at high frequencies.

Further, this high frequency signal is chosen such that as signals try to propagate through the casing 22 away from the cable 3 contact point, a relatively high impedance is seen due to the skin effect in the casing 22. The frequency chosen in this case might be in the order of 10 KHz.

On the other hand, the low frequency transmitter 62 is chosen to transmit at a frequency where the skin effect is far less significant such that a lower impedance path is seen for the signals applied to the casing 22 by the low frequency transmitter 62. The frequency chosen in this case might be in the order of say 5-100 Hz. This means that power may be efficiently transferred from the cable 3 across the casing 22 and into the electrode 46 (where the frequency is high) and signals may be effectively injected into the casing 22 by the low frequency transmitter 62 (where the frequency is low).

As the first frequency is increased resistance of the casing 22 due to skin effect will also increase whilst the reactive impedance of the electrode 46 will decrease thereby preferentially directing current through the toroidal transformer 48. To maximise power transfer the first frequency may be increased until the rate of increase in loss in the cable 3 equals the rate of increase of efficiency due to the preferential directing of power through the toroidal transformer 48.

In alternatives, rather than the surface power source S being arranged for applying a high frequency signal to the cable 3, a lower frequency signal may be applied to the cable 3 and up converted to the desired high frequency by a frequency converter provided as part of the power transfer arrangement 4 where the cable 3 meets the casing 22.

In another alternative the power transfer arrangement may comprise a direct connection from the cable to downhole structure—so a physical arrangement which corresponds to what is shown schematically in FIG. 1. The cable 3 may be connected to a conductive centraliser (not shown) that contacts with the surrounding tubing so injecting current from the cable 3 into the downhole structure. A significant proportion of the current will flow along the structure back to the surface, but some will flow down into the well to downhole locations.

Figure 6:
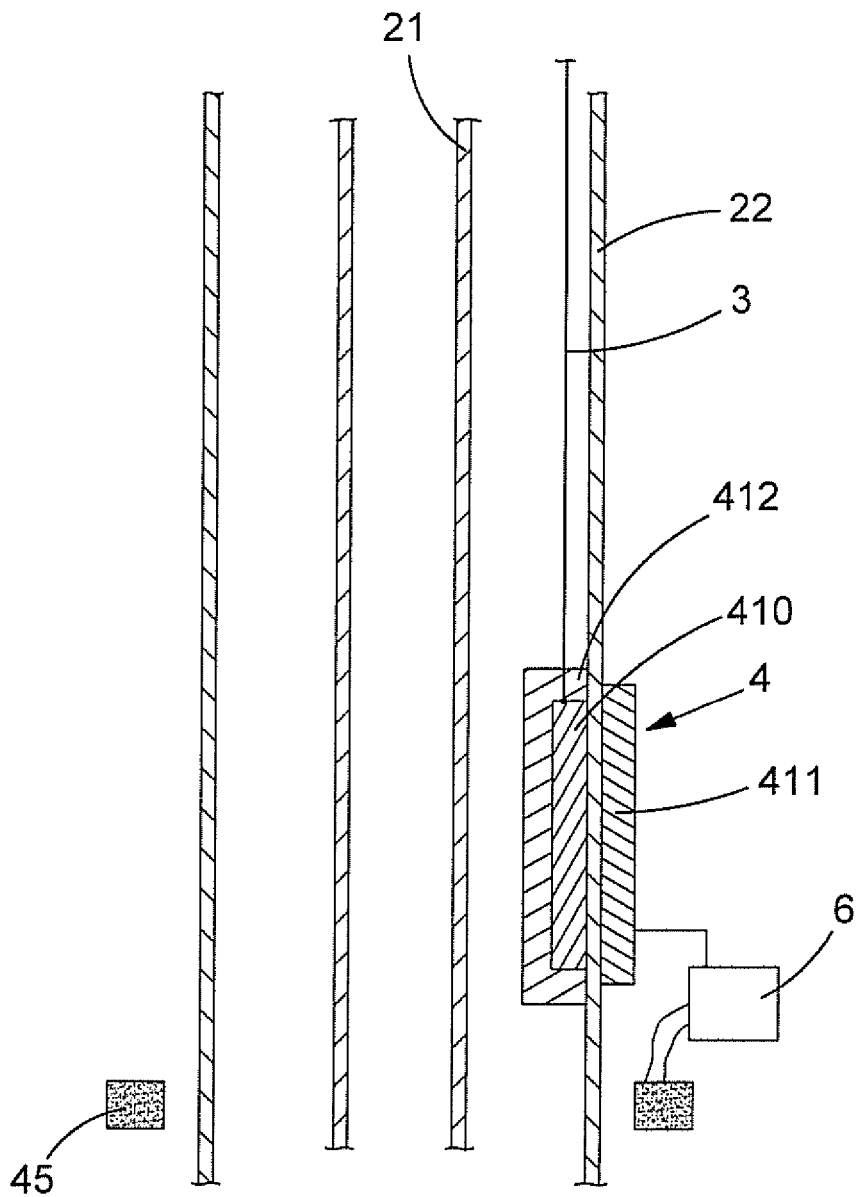
FIG. 6 shows another alternative power transfer arrangement which may be used in power delivery apparatus of the type shown in FIG. 1.

FIG. 6 shows another alternative implementation for the power transfer arrangement 4 which can be used in an arrangement as shown in FIG. 1. Here again the cable 3 runs from the surface in the annulus between the production tubing 21 and the casing 22 until it reaches the power transfer arrangement 4. In this instance the cable 3 is connected to a heater 410 provided against the internal wall of the casing 12. An array of thermo-electric devices 411 are provided outside the casing 22 at the location of the heater 410. The output of the array of thermo-electric devices 11 is connected to a central unit 6 which in turn is connected to, and arranged to drive, a toroid 45 provided around the casing 22. Together the central unit 6 and toroid 45 act as electrical power transmission means for applying electrical power to the downhole metallic structure such that it may be transmitted onwards down into the well towards the downhole tool T as shown in FIG. 1. A thermo-shield 412 is provided around the heater 410 to help ensure that as much heat as possible from the heater 410 is transmitted through the casing wall 22.

As will be appreciated the thermo-electric devices 11 are appropriately arranged together to give a useful electrical power output due to the temperature difference between the casing as heated by the heater 410 and the surroundings.

FIG. 7 shows an alternative well installation to that shown in FIG. 1 which also includes a power delivery system. In this case the well is an abandoned well with a well head 1 provided at the surface and downhole metallic structure 2 in the form of casing 22 descending down into the well. Since this is an abandoned well then at least one, and in this embodiment, two cement plugs 701 are provided for sealing the well against the escape of product from the formation into which the well was originally drilled. Of course plugs of other types might be present, in particular plugs of other sealing materials. Further in some cases there may be no well head.

Note that in some cases an abandoned well will be deliberately drilled as a test installation and never intended to produce product. In other circumstances an abandoned well may be drilled and left in an abandoned state for subsequent use as a producing well if circumstances change or an abandoned well may arise where the well has been used for production at some stage but production has been ceased either temporarily or permanently.

In most, if not all, of these circumstances it is desirable to have information concerning the conditions below the plugs 701. In particular it is desirable to be able to take pressure and/or temperature measurements at such a location over an extended period of time.

The techniques described above for delivering power to a downhole tool T can used for an abandoned well situation as the type shown in FIG. 7. Any of the power delivery techniques described above in relation to FIGS. 1 to 6 may be used in the abandoned well installation as the type shown in FIG. 7 (which a length of tubing being provided within the casing above the plug if desired). Thus a power supply S is provided at the surface and energy from this is conducted downhole via the cable 3 as electrical signals as far as the power transfer arrangement 4 where the signals are then put on to the metallic structure in this case, casing 22.

In this case the downhole tool T to be powered by the system is provided for taking pressure and/or temperature measurements below the plugs 701 and transmitting the signals back to the surface. In the present embodiment a toroid 51 is provided at the downhole tool T for picking up power which has been applied to the casing 22. A proportion of this power in the region of the tool T flows through a conductive body of the tool T and hence through the toroid 51. Similarly the toroid 51 is arranged for applying signals onto the casing 22 for transmission back towards the surface under the control of the central unit 52.

Of course other different signalling techniques might be used.

In an alternative an insulation joint can be provided in the tool T—this insulating contacts of the tool to the downhole structure at one end of the tool from contacts of the tool to the downhole structure at the other end of the tool. This can remove the need for the above described toroid arrangement. A possibility then is to connect a primary winding of a transformer to either side of the insulation joint. The transformer would be arranged to have turns ratio to step up the voltage to be useful. This allows impedance matching and can be preferable to the toroid based method mentioned above. Of course this type of arrangement can also be used for signalling.

Note that in some installations of any of the above types there may be a break in the continuity of the casing 22 at some point between the power transfer arrangement 4 and the downhole tool T. The present techniques can still be used for powering a downhole tool T in such circumstances provided that some mechanism is provided for bridging that gap in the casing 22.

Further in some cases breaks in the continuity of the metallic structure, eg casing 22 may be deliberately provided to aid power pick-up and signalling.

FIG. 8 shows an alternative well installation which is similar to that shown in FIG. 7 and includes a similar power delivery system. Here the difference is that there are two downhole tools T', T and each is arranged for picking up power and signals across a respective break B in the casing 22 and applying signals across that break B. Because of the presence of the breaks B different forms of downhole tools T', T are used.

At least the upper tool T' includes a controllable conduction path (not shown) to allow control of the proportion of current in the casing 22 which is able to pass the break B in the casing 22. The controllable conduction path may comprise a switch—allowing short circuit and open circuit conditions between sections of metallic structure on either side of the break B and/or variable impedance means allowing introduction of a selected non-zero impedance between sections of metallic structure on either side of the break B. This for example allows the upper tool T' to cause the conduction path to go open circuit whilst it is harvesting power and/or receiving data and/or whilst transmitting on the one hand and to go short circuit at other times to allow signals to pass on to the lower tool T.

The lower tool T can have this capability as well if desired, but this is not required if there are no tools further below in that borehole.

Similarly the lower tool T need not be connected across a break B in the casing 22.

Again an insulation joint may be provided in either or both of the tools as mentioned above and this can be preferable.

Insulation may be provided on the casing 22 to improve efficiency. In particular insulation may be provided between the casing 22 and the formation and this may be in the region of at least one of the tools and preferably over the region between all of the harvesting tools or at least between two of the harvesting tools—in this case the two tools T,T'.

With multiple pick up points it will be desirable to control or by design arrange for proportionate shared harvesting as required. For example, at longer ranges a greater share may be needed for the same level of performance/service. In other cases, sharing could be determined/set by modelling and then configuration. Further to this, in another arrangement the system may be arranged to work in an adhoc manner such that once a location has harvested and stored enough energy it would then short out the break or short the winding on a toroid (shorting a winding on a toroid minimises/eliminates inductance presented by the toroid) to allow another unit to harvest. The unit could then re-activate harvesting—ie reverse the short—when required. In another arrangement harvesting may be time synchronised—that is to say units may be arranged to harvest at different times from one another.

Other methods can be considered for applying and/or picking up power and/or communication signals, for example there may be direct galvanic connections between a transceiver in the tool T', T and the respective sections of casing on either side of the respective breaks B.

In each of the above arrangements, the frequency of the electrical power signals applied to the metallic structure for pick up by the power pick up arrangement(s) 5 may be chosen to optimise energy harvesting. The aim is to maximise the current at the harvesting location. There is a balance between the skin effect (increasing impedance at high frequencies) and losses to the surroundings which will tend to be lower at higher frequencies. The optimum frequency may depend on the depth of the harvesting location.

There is also a balance between the ideal frequency for operation of the power transfer arrangement and the signal channel downhole. For example where a toroid is used to apply signals to the structure this will generally be optimum at higher frequencies than may be ideal for the channel.

Preferably the optimum frequency for signals to be applied by the power transfer arrangement is determined by determining an initial frequency for the signals by modelling the installation and system and then trimming (adjusting) this after installation to maximise power transfer and thereby arrive at the optimum frequency.

In at least some case a suitable frequency may be in the order of 10 Hz.

In some cases one or more of the above arrangements may comprise a downhole frequency converter. The downhole frequency converter may be used so that the frequency of the signals applied to the cable at the surface may be different from that applied to the metallic structure by the power transfer arrangement. Thus, for example, in the arrangement shown in FIG. 3, a downhole frequency converter may be provided between the cable 3 and the inductive coupling 41. Similarly in the arrangement shown in FIG. 4, a downhole frequency converter dfc may be provided between the second solenoidal winding 44 and the inductive coupling 45 (as shown indicatively in dotted lines in FIG. 4) and/or between the cable 3 and the first solenoidal winding 43. Note there may be an optimum frequency for operation of the solenoidal windings 43, 44 which differs from that for the toroidal coupling 45 and harvesting. A frequency converter is already mentioned above as an option for the arrangement shown in FIG. 5. As will be appreciated a frequency converter may also be similarly provided in the arrangements shown in FIGS. 6, 7 and 8 and the alternative where there is direct injection into the structure described above.

In each of the above arrangements, where power is put onto the metallic structure at a location above the level of a packer, it is particularly advantageous, and therefore preferred, to provide insulation between the downhole structure and the formation in the region from the packer down to the start of the reservoir. The amount of loss in the relatively small region if no insulation is provided is disproportionally high because the formation in the reservoir will be much less conductive than this region just above the reservoir. In practical terms this may mean providing an insulated coating on at least say 100m of the production tubing below the packer and preferably also on say the bottommost 100m of the casing. In some cases all of the metallic structure from the power transfer arrangement 4 downwards, apart from a conductive tail portion, for example an extension portion, may be insulated.

Note that in a particular implementation, the power supplied by the present techniques may be used to control and operate a number of valves in an intelligent well situation. Here, there may be a plurality of producing zones spaced along one portion of production tubing and valves may be opened and closed to allow selected ones of the producing zones to produce at particular times. In some circumstances one or more producing zone might start producing water either permanently or temporarily. In such a case, the valve into such a position zone may be closed.

In one particular implementation, where there is a plurality of producing zones, each with an associated valve and it is determined that the well is producing a certain amount of water amongst the product, normal production may be ceased temporarily and the valves controlling each production zone opened one at a time and the output monitored to see when water is produced. Once it is identified that one particular production zone is producing water then that valve may be retained in a shut position unless and until it is desired to test that production zone again to see if it has again begun to produce product rather than water.

As will be appreciated in implementing such a method for determining which zone is producing water, the current techniques of power delivery may be used to supply power to control the operation of the valves and provide power for operating the valves in order to carry out the programed pattern of valve opening and closing.

A more practical arrangement might be to detect an interval or zone where water is being produced, (for example using a capacitance, viscosity or resistivity sensor) and then, using stored energy, (for example from a gas spring), close the valve as a one shot device. This has the advantage of not requiring the much larger amount of energy to power a valve which may be prohibitive due to leakage of energy from the storage means being greater than harvest rate. Thus here harvested power is being used to control and/or trigger operation of a downhole device (here a valve) rather than provide all of the power for operating the device.

With systems of the present type then perhaps 100*w* of power may be provided to the cable 3 at the surface whereas the amount of electrical power picked up for delivery to the tool may be in the region of 50*mw*. It will be appreciated that whilst therefore the power delivery system is undeniably lossy, it can still provide a useful amount of power for use by a downhole tool.

In the above systems the downhole tool T may be arranged to signal back to the surface by modulating the load which the power pick up arrangement 5 puts on the power delivery system. Such changes in the load will cause a variation in the potential across the power supply S at the surface. Thus data may be encoded by the tool T modulating the load and extracted at the surface by monitoring these changes in potential difference across the power supply S or changes in potential in the cable 3 relative to a reference. This provides transmission with a particularly low energy consumption downhole and may, for example, allow continuous operation of a sensor downhole via power from the surface without the need for downhole energy storage. Thus in one particular case the downhole tool T powered by the delivery system may comprise just such a sensor or gauge.

The invention claimed is:

1. A well installation comprising a downhole power transfer arrangement for transferring electrical power from inside a run of downhole metallic pipe provided in a borehole to outside the run of downhole metallic pipe, in situations where a source of electrical power is electrically connectable to a first, inside, surface of the run of downhole metallic pipe, the arrangement comprising:

an electrode for location outside of the run of downhole metallic pipe which is arranged to contact with the surroundings of the borehole, a conducting portion for electrically connecting the electrode to a second, outside, surface of the run of downhole metallic pipe, and a pick up winding which is inductively coupled with the conducting portion such that current flow to the electrode induces current flow in the pick up winding for use as electrical power outside of the run of downhole metallic pipe, the downhole power transfer arrangement being provided as part of a downhole power delivery apparatus for delivering electrical power from a surface power source to a downhole tool, the well installation comprising downhole metallic structure running down into a borehole, which downhole metallic structure comprises the run of downhole metallic pipe, and the apparatus comprising an electrical cable for carrying electrical power from the surface power source, said power transfer arrangement and a power pick up arrangement, the cable running down into the borehole together with the metallic structure to the power transfer arrangement which is provided at a first downhole location for transferring electrical power carried by the electrical cable onto the downhole metallic structure for onward conduction, and the power pick up arrangement being provided at a second downhole location, spaced from the first, for picking up electrical power from the downhole metallic structure for supply to the downhole tool.

2. A well installation according to claim 1 which is a multi-lateral well installation comprising a main bore and at least one lateral bore branching from the main bore in which the power transfer arrangement is provided for transferring electrical power onto the downhole metallic structure in the main bore of the multi-lateral well installation and the power pick up arrangement is provided for picking up electrical power from the downhole metallic structure in the lateral bore.

3. A well installation according to claim 1 in which the power transfer arrangement is provided for transferring electrical power onto the downhole metallic structure at a location above a packer provided in the well installation.

4. A well installation according to claim 1 in which the downhole metallic structure of the well installation comprises an extension section extending beyond a production zone.

5. A well installation according to claim 4 in which the well installation is arranged so that beyond the location of the power pick up arrangement, the downhole metallic structure extends beyond a production zone of the well into a conductive zone.

6. A well installation according to claim 1 in which the power pick up arrangement comprises a toroidal inductive coupling provided around the downhole metallic structure.

7. A well installation according to claim 1 in which the power transfer arrangement comprises a direct connection of the cable to the metallic structure.

8. A well installation according to claim 1 in which the power transfer arrangement comprises a toroidal inductive coupling provided around the downhole metallic structure.

9. A well installation according to claim 1 in which insulation means are provided in the region of the power transfer arrangement for insulating the metallic structure to which the power transfer arrangement is arranged to transfer power from its surroundings.

10. A well installation according to claim 9 in which the insulation means comprise insulating spacers for spacing production tubing from casing in the region of the power transfer arrangement.

11. A well installation according to claim 1 which is an abandoned well installation and the power transfer arrangement is arranged for transferring electrical power onto downhole metallic structure in the abandoned well at a location above a plug which seals the well.

12. A well installation according to claim 1, wherein the electrode is arranged to contact with the surroundings of the bore hole with the cable electrically connectable to the electrode to allow a flow of current from the cable to the surroundings, the pick up winding is inductively coupled with the cable or an electrical connection between the cable and the electrode so that one of said cable and said electrical connection act as said conducting portion, such that current flow to the electrode induces current flow in the pick up winding, and the power transfer arrangement further comprises electrical power transmission means arranged to be driven by current induced in the pick up winding and arranged for applying electrical power to the downhole metallic structure.

13. A well installation according to claim 12 in which the electrical power transmission means comprises a transmitter which has one terminal connected to the electrode and one terminal connected to the downhole metallic structure.

14. A well installation according to claim 12 in which the power transmission means is provided at a region where the well installation comprises production tubing provided with casing, the cable runs within the annulus between the production tubing and the casing and the electrode is provided outside of the casing, wherein the cable electrically contacts with the casing at the location of the power transmission means and the power transmission means comprises an electrical contact member outside of the casing, which is electrically connected to the casing and the electrode such that there is an electrical conduction path from the cable, through the casing and electrical contact member to the electrode.

15. A well installation according to claim 14 in which the power delivery apparatus is arranged so that the current flowing to the electrode is alternating current with a frequency selected to cause the skin effect to increase the impedance of a current flow path into the metallic structure in the region of the electrode so as to preferentially cause current flow via the electrode.

16. A well installation according to claim 15 in which the first frequency is at least 1 kHz.

17. A well installation according to claim 14 in which the power delivery apparatus is arranged so that the current flowing to the electrode is alternating current with a first frequency and arranged so that the current caused to flow in the metallic structure by the electrical power transmission means is an alternating current with a second frequency which is lower than the first frequency.

18. A well installation according to claim 17 in which the first frequency is at least 1 kHz and the second frequency is less than 100 Hz.

19. A well installation according to claim 1, wherein the power pick up arrangement comprises a downhole tool, provided within the metallic structure.

20. A well installation according to claim 19 in which the downhole tool comprises a spaced pair of contacts for contacting the metallic structure at spaced locations such that a portion of current flowing in the metallic structure can flow through the tool.

21. A well installation according to claim 19 in which the power pick up arrangement comprises a pick up tool electrically connected across a break in the downhole metallic structure.

22. A well installation according to claim 21 in which the pick up tool comprises a conduction path for electrically connecting together sections of downhole metallic pipe on either side of the break.

23. A well installation according to claim 22 in which the conduction path is a controllable conduction path such that the impedance of the conduction path is controllably variable.

24. A well installation according to claim 23 in which a plurality of power pick up arrangements are located on a length of metallic structure with each connected across a respective break in the metallic structure.

25. A downhole power transfer arrangement for transferring electrical power from inside a run of downhole metallic pipe provided in a borehole to outside the run of downhole metallic pipe, in situations where a source of electrical power is electrically connectable to a first, inside, surface of the run of downhole metallic pipe, the arrangement comprising,
an electrode for location outside of the run of downhole metallic pipe which is arranged to contact with the surroundings of the borehole,
a conducting portion for electrically connecting the electrode to a second, outside, surface of the run of downhole metallic pipe, and
a pick up winding which is inductively coupled with the conducting portion such that current flow to the electrode induces current flow in the pick up winding for use as electrical power outside of the run of downhole metallic pipe,
wherein the electrode is insulated from the first run of downhole metallic pipe by insulation provided between the electrode and the first run of downhole metallic pipe.

26. A method of delivering power to a tool downhole in a well installation from a surface power source, the well installation comprising downhole metallic structure running down into a borehole and the method comprising the steps of:
using an electrical cable for carrying electrical power from the surface power source to a first downhole location;
transferring electrical power carried by the electrical cable, using a downhole power transfer arrangement according to claim 25, onto the downhole metallic structure at the first location for onward conduction; and
picking up electrical power from the downhole metallic structure at a second downhole location for supply to the downhole tool.

27. Downhole power delivery apparatus for delivering electrical power from a surface power source to a tool downhole in a well installation which comprises downhole metallic structure running down into a borehole, the downhole power delivery apparatus comprising an electrical cable for carrying electrical power from the surface power source, a downhole power transfer arrangement according to claim 25 and a power pick up arrangement, the cable being arranged for running down into the borehole together with the metallic structure to the power transfer arrangement which is to be provided at a first downhole location for transferring electrical power carried by the electrical cable onto the downhole metallic structure for onward conduction, and the power pick up arrangement being arranged to be disposed at a second downhole location, spaced from the first, for picking up electrical power from the downhole metallic structure for supply to the downhole tool.

28. A well installation comprising a downhole power transfer arrangement according to claim 25.

29. A downhole power transfer arrangement according to claim 25 in which the conducting portion comprises an electrical contact member provided outside of the run of downhole metallic pipe.

30. A downhole power transfer arrangement according to claim 25 in which the electrode is arranged as a sleeve-like outer layer around the first run of downhole metallic pipe.

31. A downhole power transfer arrangement according to claim 25 which further comprises a frequency convertor for converting the frequency of current received from the cable for application to the electrode.

32. A downhole power transfer arrangement according to claim 25 in which the current flow to the electrode has a frequency of at least 1 kHz.

33. A downhole power transfer system for transferring electrical power from inside a run of downhole metallic pipe provided in a borehole to outside the run of downhole metallic pipe, comprising
- a source of electrical power which is electrically connected or connectable to a first, inside, surface of the run of downhole metallic pipe,
- an electrode disposed radially outside of the run of downhole metallic pipe which is arranged to contact with the surroundings of the borehole and is electrically connected or connectable via a conducting portion, which extends transversely to the run of downhole metallic pipe, to a second, outside, surface of the run of downhole metallic pipe to allow a flow of current from the source of electrical power to the surroundings via the electrode, and
- a pick up winding which is inductively coupled with the conducting portion such that current flow to the electrode induces current flow in the pick up winding for use as electrical power outside of the run of downhole metallic pipe.

34. A downhole power transfer arrangement for transferring electrical power from inside a run of downhole metallic pipe provided in a borehole to outside the run of downhole metallic pipe, in situations where a source of electrical power is electrically connectable to a first, inside, surface of the run of downhole metallic pipe, the arrangement comprising,
- an electrode for location radially outside of the run of downhole metallic pipe which is arranged to contact with the surroundings of the borehole,
- a conducting portion for extending transversely to the run of downhole metallic pipe and electrically connecting the electrode to a second, outside, surface of the run of downhole metallic pipe, and
- a pick up winding which is inductively coupled with the conducting portion such that current flow to the electrode induces current flow in the pick up winding for use as electrical power outside of the run of downhole metallic pipe.

35. A downhole power transfer arrangement for transferring electrical power from inside a run of downhole metallic pipe provided in a borehole to outside the run of downhole metallic pipe, in situations where a source of electrical power is electrically connectable to a first, inside, surface of the run of downhole metallic pipe, the arrangement comprising,
- an electrode for location outside of the run of downhole metallic pipe which is arranged to contact with the surroundings of the borehole,
- a conducting portion for electrically connecting the electrode to a second, outside, surface of the run of downhole metallic pipe, and
- a pick up winding which is inductively coupled with the conducting portion such that current flow to the electrode induces current flow in the pick up winding for use as electrical power outside of the run of downhole metallic pipe wherein:
- the electrode is arranged as a sleeve-like outer layer around the first run of downhole metallic pipe.

\* \* \* \* \*